(12) United States Patent
Hock

(10) Patent No.: US 7,021,478 B1
(45) Date of Patent: Apr. 4, 2006

(54) PLASTIC CLOSURE WITH COMPRESSION MOLDED SEALING/BARRIER LINER

(75) Inventor: Mark R. Hock, Toledo, OH (US)

(73) Assignee: Owens-Illinois Closure Inc., Toledo, OH (US)

(*) Notice: Subject to any disclaimer, the term of this patent is extended or adjusted under 35 U.S.C. 154(b) by 414 days.

(21) Appl. No.: 10/384,945

(22) Filed: Mar. 10, 2003

Related U.S. Application Data

(62) Division of application No. 09/755,941, filed on Jan. 5, 2001, now abandoned.

(51) Int. Cl.
*B65D 53/00* (2006.01)
*B29B 13/00* (2006.01)

(52) U.S. Cl. ............... 215/349; 215/341; 215/350; 264/268; 264/271.1; 264/255; 264/250; 264/320

(58) Field of Classification Search ............ 215/121, 215/347, 349, 350, 351, 341, 261; 220/304, 220/378; 264/268, 271.1, 320, 250, 255; 428/36.7, 476.3, 476.9, 500
See application file for complete search history.

(56) References Cited

U.S. PATENT DOCUMENTS

| | | | |
|---|---|---|---|
| 2,130,749 A | 9/1938 | Till | |
| 3,874,961 A | 4/1975 | Curry et al. | |
| 4,640,428 A | 2/1987 | Chang | |
| 4,649,013 A | 3/1987 | Yamamoto et al. | |
| 4,723,678 A | 2/1988 | Kollen et al. | |
| 4,756,437 A | 7/1988 | Rossi-Mossuti | |
| 4,785,952 A | 11/1988 | Obadia | |
| 4,789,074 A | 12/1988 | Han | |
| 4,818,577 A | 4/1989 | Ou-Yang | |
| 4,852,754 A | 8/1989 | Holdsworth et al. | |
| 4,872,573 A | 10/1989 | Johnson et al. | |
| 5,160,687 A | 11/1992 | Margaria | |
| 5,175,036 A | 12/1992 | Smiley et al. | |
| 5,756,178 A | 5/1998 | Obadia | |
| 5,839,592 A | 11/1998 | Hayes | |
| 5,947,311 A | 9/1999 | Gregory | |
| 6,095,359 A | 8/2000 | Richmond | |
| 6,235,822 B1 * | 5/2001 | Whetten et al. | ............ 524/191 |
| 6,279,789 B1 | 8/2001 | Krall | |
| 6,312,776 B1 | 11/2001 | Finkelstein | |
| 6,371,318 B1 * | 4/2002 | Riffer | ............ 215/347 |
| 6,399,170 B1 * | 6/2002 | Hock et al. | ............ 428/36.6 |
| 6,508,375 B1 * | 1/2003 | Krall | ............ 220/359.1 |
| 2001/0013671 A1 | 8/2001 | Parrinello | |

FOREIGN PATENT DOCUMENTS

DE 3813275 11/1989
EP 112103 6/1984

(Continued)

*Primary Examiner*—Robin A Hylton

(57) ABSTRACT

A plastic closure includes a closure shell having a base wall and a peripheral skirt, and a sealing liner disposed on the base wall of the closure. The sealing liner includes an outer sealing layer of resilient resin secured to the base wall within the skirt, and an inner layer of barrier resin underlying the sealing layer. The base wall and the sealing layer have opposed flat surfaces, one of which has a pocket in which the barrier resin layer is disposed. The sealing layer has a periphery that extends beyond the periphery of the barrier resin layer, so that the sealing layer completely overlies and covers the barrier layer.

12 Claims, 1 Drawing Sheet

FOREIGN PATENT DOCUMENTS

| | | |
|---|---|---|
| EP | 0926078 | 6/1999 |
| EP | 0926215 | 6/1999 |
| EP | 1 081 058 A1 * | 3/2001 |
| FR | 968336 | 11/1950 |
| JP | 11-278553 A * | 10/1999 |
| JP | 2001-130604 A * | 5/2001 |

* cited by examiner

PLASTIC CLOSURE WITH COMPRESSION MOLDED SEALING/BARRIER LINER

This application is a division of application Ser. No. 09/755,941 filed Jan. 5, 2001 now abandoned.

The present invention is directed to plastic container closures for beverage, food, juice, pharmaceutical and like applications, and more particularly to an improved closure and method of manufacture having a sealing liner with barrier resistance to transmission of gases (such as oxygen and carbon dioxide), water vapor and/or flavorants (flavor scalping). The invention is also directed to a package that embodies such a closure.

BACKGROUND OF THE INVENTION

It has heretofore been proposed to provide a plastic closure for a container, which comprises a plastic cap or shell with an interior liner for sealing engagement with the sealing surface of the container finish. For example, U.S. Pat. No. 4,984,703 discloses aplastic closure that includes a shell having a base wall with a peripheral skirt and an internal thread for securing the closure to a container, and a sealing liner compression molded in situ on the interior of the shell base wall. The sealing liner comprises a blend of ethylene vinyl acetate (EVA) and a thermoplastic elastomer material such as olefin or styrene-butadiene-styrene (SBS). U.S. Pat. No. 5,451,360 discloses a method and apparatus for compression molding the liner in situ within the closure shell.

Although the closures and methods of manufacture disclosed in the noted patents address problems theretofore extant in the art, further improvements remain desirable. For example, although olefin copolymers such as EVA are sufficiently resilient to provide good sealing against the sealing surface of a container when the closure is fastened to the container, these materials do not provide an acceptable barrier against transmission of gases, such as oxygen and carbon dioxide, that can deleteriously affect the product within the container. It has been proposed to employ a barrier material such as ethylene vinyl alcohol (EVOH) as a gas transmission barrier liner. However, materials of this character tend to be expensive and brittle, and are not well suited to function as a seal. It is therefore a general object of the present invention, in accordance with one aspect of the invention, to provide a liner for a plastic closure that combines the functions of a seal for engagement with the container sealing surface and an improved barrier against gas transmission, flavor absorption (flavor scalping) and/or water vapor permeation. Other objects of the invention, in accordance with other aspects of the invention, are to provide a method of making such a closure and a package that includes such a closure.

SUMMARY OF THE INVENTION

A plastic closure in accordance with one aspect of the present invention includes a closure shell having a base wall and a peripheral skirt, and a sealing liner disposed on the base wall of the closure. The sealing liner includes an outer sealing layer of relatively soft resilient resin secured to the base wall within the skirt, and an inner layer of barrier resin underlying the outer sealing layer. The base wall and the sealing layer have opposed flat surfaces, one of which has a pocket in which the barrier resin layer is disposed. The outer sealing layer has a periphery that extends beyond the periphery of the inner barrier resin layer, so that the sealing layer completely overlies and covers the barrier layer, and protects the barrier layer against absorption of moisture and other materials that can deleteriously affect the barrier properties of the barrier layer.

The resilient resin of the outer sealing layer preferably comprises a thermoplastic elastomer, a soft olefin polymer or a combination thereof. A thermoplastic elastomer is a synthetic polymer having the processability of a thermoplastic material and the functional performance and properties of a conventional thermoset rubber. There are six generic classes of thermoplastic elastomer commercially available, including styrenic block, copolymers (SBC), polyolefin blends (TPO), elastomeric alloys, thermoplastic polyurethanes (TPU), thermoplastic copolymers and thermoplastic polyamides. Thermoplastic elastomers are described beginning at page 64 in *Modern Plastics Encyclopedia Handbook*, published by McGraw-Hill, 1994, the disclosure of which is incorporated by reference. Examples of thermoplastic elastomers are styrene block copolymers as manufactured by Shell Chemical under the trademark KRATON. These synthetic polymers consist of three discrete blocks of linear or A-B-A type styrene. An elastomeric alloy is ethylene-propylene-diene terpolymer (EPDM). Another elastomeric alloy consists of compounds of EPDM/PP and butyl rubber/PP as manufactured by Advanced Elastomer Systems under the trade names SANTOPRENE and TREFSIN, and disclosed in U.S. Pat. Nos. 4,130,535, 4,311,628, 4,130,534 and 4,607,074. In general, thermoplastic elastomers are characterized by a Shore A hardness of 45 to 95 and a flexural modulus of 30,000 to 1000,000 psi.

Soft olefin polymers are thermoplastic olefins, homopolymers and copolymers that are flexible and elastic, with a Shore A hardness of less than about 100. Typical soft olefin polymers are: metallocene-modified polyethylene, ethylene-propylene rubbers, ethylene copolymers and blends thereof; and ethylene copolymers such as ethylene vinyl acetate, ethylene methyl acrylate copolymers and ionomers, and combinations thereof. Examples of soft olefin polymers are alpha olefin substituted polyethylene manufactured using single site catalyst technology (these materials are known in the art as metallocene-modified polyethylenes); ethylene vinyl acetate (EVA) such as manufactured by DuPont under the trademark ELVAX; polypropylene made with single site catalyst technology known in the art as metallocene-modified polypropylene, syndiotactic polypropylenes as marketed by Fina Oil and Chemical; ethylene/propylene copolymers and styrene-ethylene interpolymers as marketed by Dow Chemical; and ionomers such as DuPont's SURLYN product line.

The barrier resin is a thermoplastic material that has a low gas and/or water vapor transmission rate and a high barrier to odorants and essential flavorant oils. The following materials have gas transmission rates lower than EVA, which is an industry standard liner material: EVOH (ethylene vinyl alcohol) such as Nippon Goshei's SOARNOL (trademark) product line and Evalca's EVAL (trademark) product line; nylons such as DuPont's SELAR (trademark) PA, EMS's G21 and Mitsubishi Gas' MXD6 product lines; British Petroleum's BAREX (trademark) acrylonitrile product line; blends of EVOH and amorphous nylon; blends of EVOH and an ionomer such as SURLYN (DuPont); and cyclic olefin copolymers such as marketed by Ticona. Other suitable barrier materials are blends as disclosed in U.S. Pat. Nos. 4,977,004 and 5,064,716, and nanocomposites of EVOH or nylon and clay as disclosed in U.S. Pat. Nos. 4,472,538 and 5,552,469, the disclosures of which are incorporated herein by reference.

The barrier resin is different from the sealing layer resin. The barrier resin may be preblended with a compatibilizer material to help adhere the barrier resin layer to the closure base wall and to adhere the sealing layer resin to the barrier resin layer. A compatibilizer is a thermoplastic that ties two other thermoplastics together by a reactive (covalent or dipole—dipole) bond or a non-reactive (chain entanglement) means. Examples include maleic anhydride grafted polymers or ethylene vinyl acetate grafted polymers such as Quantum Chemical's PLEXAR (trademark), Mitsui Petrochemical's ADMER (trademark) and DuPont's BYNEL (trademark) product lines, ethylene methyl acrylate, and ionomers.

It is currently preferred that the liner also include an additive for reducing the coefficient of friction between the liner and the sealing surface of the container. Friction reducing additives include metal stearates, microcrystalline waxes, polyethylene glycols, fatty acids esters and amides. These are known as "lubricants" in the art. The preferred lubricant is a low molecular weight fatty acid amide material that blooms to the exposed surface of the polymer material upon cooling from the melt state, thereby reducing the coefficient of friction between the liner and the container sealing surface. Examples are: primary amides with the general chemical structure R—CO—NH2, where R is an alkyl group; secondary amides with the general chemical structure R—CO—NH—R', where R, R' are alkyl groups; secondary bis-amides with the general chemical structure R—CO—NH—A—NH—CO—R, where R, R' are alkyl groups and A is an alkylene group; and blends of the above materials such as in U.S. Pat. No. 5,306,542. The lubricant is preferably compounded into the sealing layer polymer material (along with any desired colorants) by the material manufacturer.

In currently preferred embodiments of the invention, the sealing layer polymer is an EVA polymer, preferably either EVA or a melt blend of EVA and styrene-ethylene-butylene-styrene (SEBS). A suitable SEBS polymer is marketed by Shell Chemical under the trademark KRATON. The barrier resin preferably comprises EVOH, either alone or blended with a compatibilizer.

In accordance with another aspect of the present invention, the plastic closure is made by compression molding the barrier polymer layer in situ on the base wall of the closure shell, and then compression molding the sealing polymer layer over the barrier polymer layer. Alternatively, but less preferably, the barrier layer may be provided as a pre-made disc of single or multilayer construction that is placed in the shell, and the sealing layer then molded over the disc. In either embodiment, the barrier polymer layer is disposed in a pocket in either the base wall of the closure shell or the sealing layer, and the sealing layer completely covers the barrier polymer layer and extends peripherally beyond the perimeter of the barrier polymer layer. In this way, the sealing layer overlies and protects the barrier layer from absorption of water vapor, for example, that can degrade the barrier properties of the barrier layer. In assembly with a container to form a package in accordance with a third aspect of the invention, the barrier polymer layer extends radially outwardly at least to the portion of the sealing layer that is compressed by engagement with the sealing surface of the container.

BRIEF DESCRIPTION OF THE DRAWINGS

The invention, together with additional objects, features and advantages thereof, will be best understood from the following description, the appended claims and the accompanying drawings in which:

DETAILED DESCRIPTION OF PREFERRED EMBODIMENTS

Figure 1:
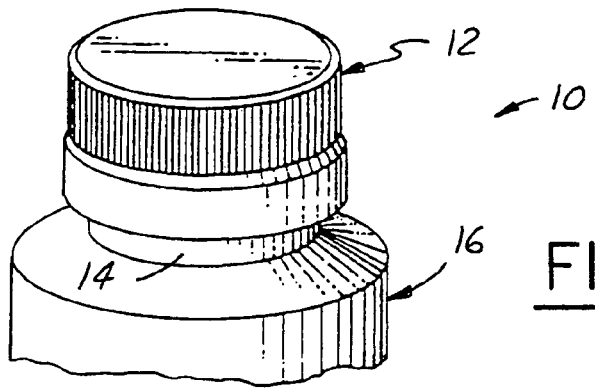
FIG. 1 is a fragmentary perspective view of a closure and container package.
Figure 2:
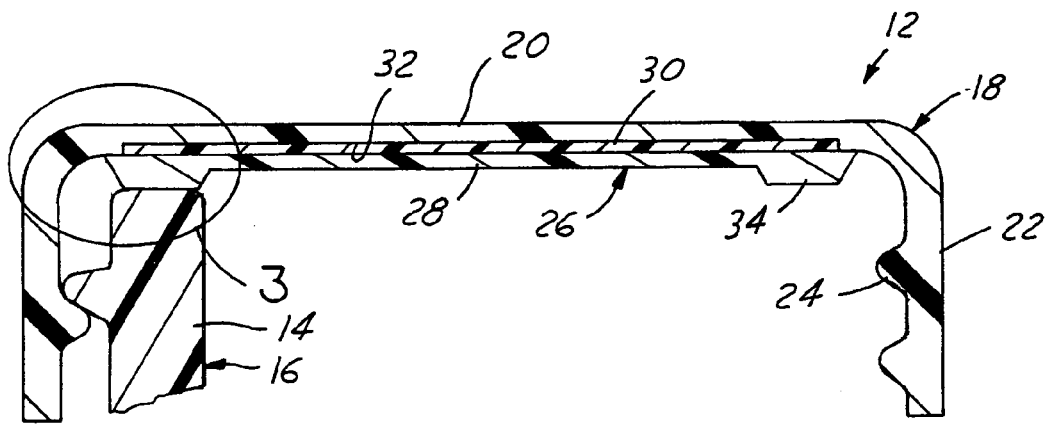
FIG. 2 is a sectioned elevational view of the plastic closure in FIG. 1 in accordance with a presently preferred embodiment of the invention.
Figure 3:
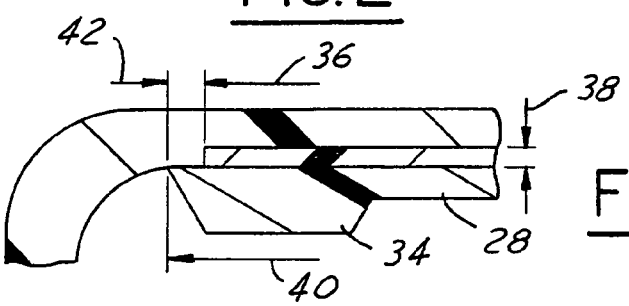
FIG. 3 is a fragmentary view on an enlarged scale of the portion of FIG. 2 within the circle 3.

FIG. 1 illustrates a package 10 as comprising a plastic closure 12 secured on the finish 14 of a container 16. Referring to FIGS. 1–3, closure 12 includes a shell 18 of suitable plastic composition such as polypropylene. Shell 18 has a base wall 20 from which a peripheral skirt 22 integrally extends. An internal thread or bead 24 is provided on skirt 22 for securing closure 12 to finish 14 of container 16. A sealing liner 26 is internally secured to base wall 20 of closure shell 18. Sealing liner 26 preferably comprises an outer layer 28 of resilient sealing polymer that overlies and completely encloses an inner layer 30 of barrier polymer. In the embodiment of FIGS. 2–3, barrier layer 30 is in the form of a circular disk disposed within a cylindrical pocket 32 in base wall 20 of closure shell 18. Sealing layer 28 completely overlies and extends radially outwardly beyond the perimeter of barrier layer 30. In the form of sealing layer 28 illustrated in FIGS. 2 and 3, the sealing layer comprises a flat centra 1 portion and an axially enlarged circumferentially continuous peripheral portion 34 for opposed abutment with container finish 14 when closure 12 is secured to container 16. The radial dimension of barrier layer 30 preferably is such as to extend at least to the portion 34 of sealing layer 28 that engages the container finish. In an exemplary embodiment of the invention for use on a 43 mm container finish, barrier layer 30 has a diameter 36 (FIG. 3) of 1.520 inches and a thickness 38 of 0.005 inches. The combined axial thickness of base wall 20 and layer 30 is 0.055 inches. Sealing layer 28 has an overall diameter 40 of 1.539 inches, providing an overlap 42 of about 0.010 inches entirely around the closure base wall, in which sealing layer 28 directly engages and is bonded to the opposing surface of base wall 20. The central portion of liner 28 has a thickness of 0.020 inches, and the peripheral portion 34 has a thickness of 0.025 inches. Diameter 36 may be reduced and overlap 42 may be increased if a greater base wall land area is needed for molding sealing layer 28.

Figure 4:
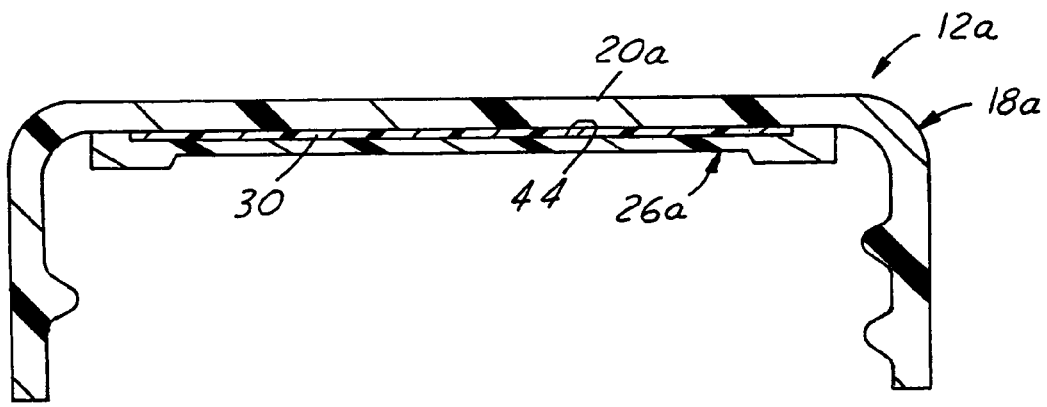
FIG. 4 is a sectional view similar to that of FIG. 2 but showing a plastic closure in accordance with a modified embodiment of the invention.

FIG. 4 illustrates a modified closure 12a, in which closure base wall 20a is of uniform thickness, and barrier layer 30 is in the form of a disk disposed in a pocket 44 on the surface of sealing liner 26a opposed to base wall 20a. The embodiment of FIG. 4 has the advantage that closure shell 18a is itself of conventional construction. In either embodiment, the closure is fabricated by compression molding sealing layer 30 in situ onto the base wall of the closure, and then compression molding sealing layer 26 or 26a over barrier layer 30. Equipment for sequentially compression molding the liner layers in situ is illustrated in U.S. Pat. No. 5,451, 360. Closure shell 18 may be provided with tamper-indicating means, as illustrated for example in U.S. Patents Re33,265, 5,462,187 or 6,053,344.

There have thus been disclosed a plastic closure, a method of manufacture and a closure and container package that fully satisfy all of the objects and aims previously set forth. The invention has been disclosed in conjunction with presently preferred embodiments thereof, and a number of modifications and variations have been suggested. Other modifications and variations will readily suggest themselves to persons of ordinary skill in the art in view of the foregoing description. The invention is intended to embrace all such modifications and variations as fall within the spirit and broad scope of the appended claims.

What is claimed is:

1. A method of making a plastic closure that includes the steps of:
   (a) providing a closure shell of integrally molded plastic construction having a base wall and a peripheral skirt,
   (b) compression molding a layer of barrier resin onto said base wall, and
   (c) compression molding a sealing layer of resilient resin over said layer of barrier resin,
   said layer of barrier resin being disposed in a pocket in either said base wall or said sealing layer and functioning as a barrier against transmission of gas, water vapor and flavorants through said liner.

2. A plastic closure that includes:
   a closure shell of integrally molded plastic construction having a base wall and a peripheral skirt, and
   a sealing liner secured to said base wall within said skirt, said sealing liner including:
   a layer of barrier resin compression molded in situ onto said base wall of said shell to function as a barrier against transmission of gas, water vapor or flavorants through said sealing liner, and
   a sealing layer of resilient resin compression molded in situ onto said base wall over said layer of barrier resin,
   said base wall and said sealing layer having opposed flat surfaces, one of which has a pocket that is peripherally surrounded by said sealing layer,
   said barrier resin layer being disposed in said pocket and thereby being sealed within said pocket by said sealing layer.

3. The closure recited in claim 2 wherein said sealing layer of said liner has a periphery that is spaced radially inwardly from said skirt.

4. The closure recited in claim 2 wherein said pocket is disposed on said base wall of said closure.

5. The closure recited in claim 2 wherein said pocket is disposed on said sealing layer.

6. The closure recited in claim 2 wherein said sealing layer resin is selected from the group consisting of thermoplastic elastomeric, soft olefin polymer and mixtures thereof.

7. The closure recited in claim 6 wherein said sealing layer resin is selected from the group consisting of EVA and EVA blends.

8. The closure recited in claim 7 wherein said sealing layer resin is a melt blend of EVA and SEBS.

9. The closure recited in claim 2 wherein said barrier layer resin is selected from the group consisting of EVOH, nylon, acrylonitrile copolymers, blends of EVOH and amorphous nylon, blends of EVOH and an ionomer, acrylonitrile, cyclic olefin polymers, and blends thereof.

10. The closure recited in claim 2 wherein said sealing layer resin is an EVA polymer and said barrier layer resin is EVOH.

11. The closure recited in claim 2 wherein said sealing layer resin is different from said barrier layer resin, and wherein wherein said sealing liner further comprises a compatibilizer resin in at least one of said sealing layer resin and said barrier layer resin to promote adhesion between said resins and between said liner and said base wall.

12. A plastic closure made in accordance with the method set forth in claim 1.

* * * * *